Oct. 26, 1926.
E. KIBELE
PUMP PISTON
Filed Nov. 7, 1924
1,604,287
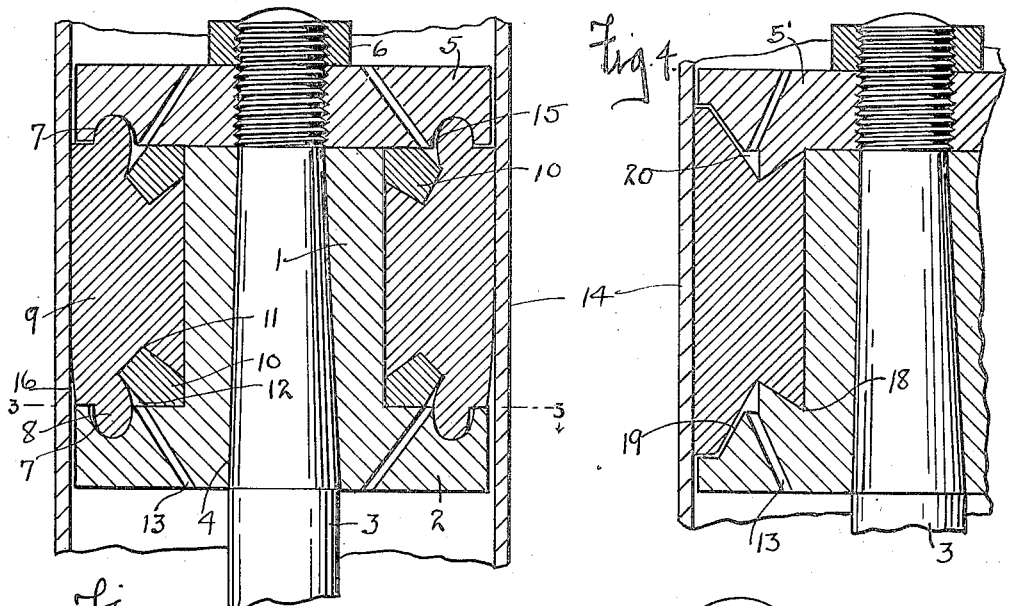
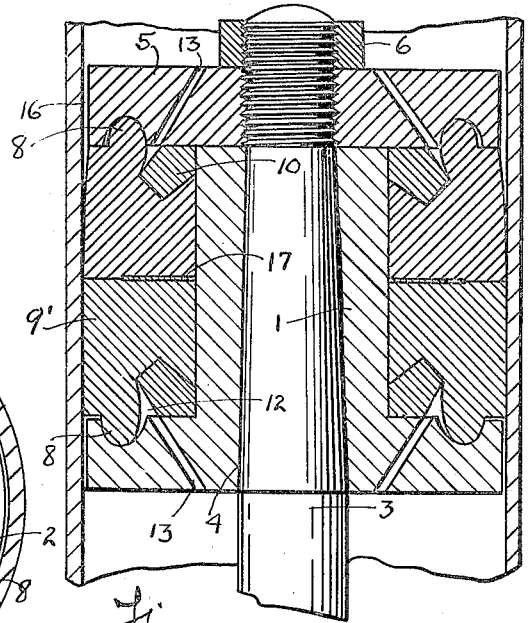
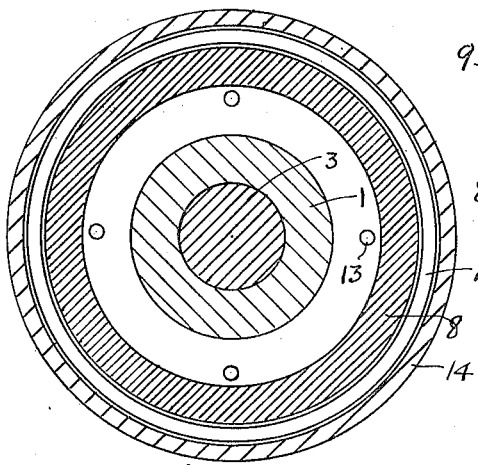
Eugene Kibele, Inventor
By Jesse R. Stone, his Attorney Patented Oct. 26, 1926.

1,604,287

UNITED STATES PATENT OFFICE.

EUGENE KIBELE, OF SAN ANTONIO, TEXAS.

PUMP PISTON.

Application filed November 7, 1924. Serial No. 748,380.

My invention relates to pump pistons for pumping various liquids and is adapted for handling water, mud, oil, etc.

An object of the invention is to provide a packing ring for pump pistons, which will be operated by the pressure exerted by the piston to be expanded or contracted to provide a proper suction as desired and reduce slippage and friction.

It is desired that the packing ring of compressible material be so formed as to be most effectively forced into position to contact with the cylinder walls even where excessive wear has taken place.

It is also an object to so construct the packing ring and the adjacent coacting parts of the piston body and follower plate, that the closure at the advancing end of the piston will be prompt and effective as soon as the piston changes its direction of movement.

Other objects will appear more clearly from the description of the device which follows, taken in connection with the accompanying drawings wherein Fig. 1 is a central, longitudinal section of a pump piston, embodying my invention. Fig. 2 is a similar view showing a slightly different embodiment thereof. Fig. 3 is a transverse section on the plane 3—3 of Fig. 1; and Fig. 4 is a broken longitudinal section of a third modification of the invention. Like numerals of reference are applied to like parts in all the views.

In the drawings I have shown a piston body comprising a central head 1, cylindrical in shape, with a heavy radial flange 2 thereon. The body has a longitudinal tapered opening 4 to receive the piston rod 3 in the usual manner, the forward end of said rod being threaded to receive a follower plate 5 of the same dimensions as the flange 2. Said plate is held in locked position against the end of the head 1 by a nut 6.

The inner opposite faces of both the follower plate 5 and the flange 2 are formed with an annular groove 7 which is shown in Figs. 1 and 2 as curved in transverse section, but which I contemplate may be of any desired contour.

Said groove forms a mortise to receive a tongue or tenon 8 upon a packing ring 9 which may be made of rubber or some other compressible elastic material or composition, as desired. Said ring fits the seat between the follower plate and flange 2 upon the piston body and normally is approximately flush with the outer diameter of the said piston. Said packing is recessed at each end adjacent its inner face to receive locking rings 10 which are shaped with inclined inner shoulders fitting within the body of the packing ring thus serving to lock the base of said ring in position firmly against the piston body.

Each ring 10 is also beveled slightly at 12 to provide a groove between the said ring and the packing; and a plurality of ducts or channels 13 lead from the adjacent end of the piston to said groove to allow the passage of fluid thereto.

In assembling the piston, the ring 10 next adjacent the flange 2 is placed in position and the packing ring, the other locking ring 10 and the follower plate are secured in position as shown in Fig. 1. Normally the packing ring tongues 8 will fit loosely in the grooves 7 and the outer surface of the ring will fit loosely in the cylinder 14. When the piston is moved in operation, the fluid under pressure of the piston will enter the ducts 13 on the advancing face, and the pressure will then be exerted against the inner face 15 of the tongue 7 at that end, thus forcing that end of the packing ring outwardly with some force. This will bring the outer face of the ring tightly against the inner cylinder wall making a close contact therewith to form an effectual seal.

The other end of the piston will be receding at that time and will cause suction which will be exerted through the ducts 13 at that end causing the tongues 8 adjacent thereto, to be drawn inwardly leaving a clearance on the outer side thereof and also upon the cylinder walls as shown at 16 in Fig. 1.

By inspection of the drawing it will be seen that the packing ring will be held tightly against the cylinder wall at its forward end, the piston moving in the direction of the arrow. The advancing half of the packing ring will perform the bulk of the work at each stroke of the piston. The friction with the cylinder wall will therefore not be excessive and the leakage or "slippage" past the packing ring will be eliminated. Also it will be noted that the greater the liquid pressure against which the piston is working, the greater will be the force holding the packing ring against the cylinder walls. When the return stroke takes place the release of the suction at the end which now becomes the advancing end will result in an abrupt rebound, throwing the advancing end of the packing ring outwardly against the cylinder wall at once, where it will be tightly held by the liquid pressure through the ducts 13, as previously described.

The resiliency of the packing ring may be assisted and the ring be constructed more economically, if it is formed in two sections as shown in Fig. 2. This construction allows the use of a thin washer 17 of resilient material to be inserted between the packing ring sections, thus tending to reinforce the ring and hold it in position. As will be obvious, however, this washer could be formed in a single packing ring, with the composition cast about it.

As will be obvious, the rings 10 may be omitted or formed integral with the piston body and follower plate, as shown in Fig. 4, the object being to so construct the piston that the packing ring may be held securely on the piston and yet leaving the end portions free to expand under fluid pressure during operation. Thus, in Fig. 4, a shouldered groove 18 of any desired shape may be under cut upon the piston body and the follower plate. Outwardly from the said groove the walls of the packing ring seat are flared outwardly at 19 in such manner as to form a small groove 20 adjacent the groove 18 into which the ducts 13 terminate. The operation of this form of piston will be the same as in the first described form, as will be obvious to one skilled in the art.

The advantages of this construction lie largely in its simple form of construction and the effective manner in which the liquid pressure may be exerted upon the packing ring to preserve the necessary fit with the cylinder walls. Through this construction the liquid pressure automatically adjusts the packing to meet the load of the liquid pumped.

Having thus described my invention, what I claim as new, and desire to protect by Letters Patent is:

1. In a pump piston, a piston body having a radial flange at one end, a follower plate, said flange and plate having opposite annular grooves therein, adjacent their outer faces, a solid packing ring of compressible material between said flange and plate, longitudinally extending tongues on said packing ring fittingly loosely within said grooves at each end, and additional means to retain said packing ring in position.

2. In a pump piston including a piston body having a radial flange thereon and a follower plate, the combination of a packing ring of flexible material between said flange and plate, tongues on said packing ring engaging in grooves on said plate and flange, and locking rings to hold the base of said packing ring on said piston, there being ducts at each end of said piston to permit entrance of fluid to a point behind said tongues for the purpose described.

3. In a pump piston, a piston body, a radial flange thereon, a follower plate, a packing ring of flexible material between said flange and plate, means at the inner side of said ring to secure it upon said body, and laterally extending means on said packing ring adapted to be forced outwardly by liquid pressure, there being ducts in said plate and flange, whereby fluid in the cylinder may enter behind said laterally extending means to force it outwardly on the advancing end and draw it inwardly on the receding end.

4. In a pump piston, a piston body having a central annular groove forming a seat, a packing ring of flexible material within said seat, there being longitudinally extending grooves at each end of said seat, and tongues on said packing ring fitting loosely within said grooves, there being ducts in the ends of said piston to conduct fluid to points behind said tongues, whereby the tongue on the advancing end may be forced outwardly and the tongue on the receding end may be drawn inwardly in the manner described.

5. In a pump piston, a piston body having a central annular groove therein forming a seat, a packing ring of flexible material in said seat, longitudinally extending tongues on said packing ring, and means whereby the fluid pressure at each end of the piston may be exerted on said packing ring to force said ring outwardly on the advancing end and draw it inwardly on the receding end in the manner described.

6. In a pump piston, a piston body having a central annular groove forming a seat, a packing ring of flexible material in said seat, means to clamp said ring to said piston, and longitudinally extending tongues on said ring engaging with grooves in the walls of said seat, there being ducts to admit fluid pressure behind said tongues for the purpose described.

7. In a pump piston, a cylindrical body having a central annular groove forming a seat, a ring of compressible material in said seat, means adjacent the bottom of said seat to clamp the ring in said seat, and longitudinally projecting ends on said ring fitting within longitudinally extending grooves in said piston body, there being ducts in the ends of said piston to allow entrance of fluid behind said projecting ends of said packing ring.

8. In a pump piston, a cylindrical body having an annular groove intermediate its ends, a ring of flexible material in said groove, longitudinally extending tongues on said ring at each end thereof engaging loosely within the end walls of said groove, there being fluid channels behind said tongues and ducts connecting said channels with the outer ends of said piston for the purpose described.

9. In a pump piston, a cylindrical body having an annular groove in its periphery midway between its ends, a packing ring of flexible material in said groove, the ends of said ring being recessed, rings of rigid material fitting in said recessed ends to secure said ring in position, and tongues on said packing ring fitting in grooves in the piston body, said piston body being constructed to allow the entrance of fluid behind said tongues.

10. A pump piston comprising a body, a separate follower; means for securing said follower relatively to said body; a single inwardly expanded packing sleeve secured between said body and said follower; and means for admitting fluid pressure first behind one peripheral edge and then behind the other peripheral edge of said single sleeve.

11. A pump piston comprising a body; a follower; means for securing said follower relatively to said body; an inwardly expanded packing sleeve secured between said body and said follower; and means for admitting fluid pressure first behind one peripheral edge and then behind the other peripheral edge of said sleeve; and means for restraining the intermediate portion of said sleeve against outward movement.

12. A pump piston comprising a head and a follower secured on a rod; a packing sleeve disposed therebetween; and inwardly extending means in the form of an inwardly expanding central fin on said packing sleeve adapted to prevent sand from entering between said follower and said sleeve.

13. A pump piston comprising a single inwardly expanding packing sleeve; a body; and a follower, each of the latter being provided with a concave interior surface adapted slidably to engage a lateral surface of said inwardly expanded packing sleeve.

14. A piston comprising a one-piece packing element having the lateral surfaces thereof inwardly divergent provided with a substantially central interior means for restraining outward movement of the central region thereof.

In testimony whereof I hereunto affix my signature this 31st day of November A. D. 1924.

EUGENE KIBELE.